United States Patent
Zupanc et al.

(10) Patent No.: US 9,404,422 B2
(45) Date of Patent: Aug. 2, 2016

(54) GAS TURBINE FUEL INJECTOR HAVING FLOW GUIDE FOR RECEIVING AIR FLOW

(71) Applicant: HONEYWELL INTERNATIONAL INC., Morristown, NJ (US)

(72) Inventors: Frank J. Zupanc, Fountain Hills, AZ (US); Ronald B. Pardington, Gilbert, AZ (US); Paul Yankowich, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 546 days.

(21) Appl. No.: 13/901,219

(22) Filed: May 23, 2013

(65) Prior Publication Data
US 2014/0345286 A1 Nov. 27, 2014

(51) Int. Cl.
| F23R 3/28 | (2006.01) |
| F02C 7/22 | (2006.01) |
| F23R 3/04 | (2006.01) |
| F23R 3/12 | (2006.01) |
| F23D 11/10 | (2006.01) |
| F23R 3/14 | (2006.01) |
| F02C 3/09 | (2006.01) |

(52) U.S. Cl.
CPC ............... *F02C 7/22* (2013.01); *F23D 11/103* (2013.01); *F23D 11/107* (2013.01); *F23R 3/04* (2013.01); *F23R 3/12* (2013.01); *F23R 3/14* (2013.01); *F23R 3/283* (2013.01); *F02C 3/09* (2013.01)

(58) Field of Classification Search
CPC .............. F23R 3/04; F23R 3/26; F23R 3/286; F23R 3/045; F23R 3/283; F23R 3/14; F23R 3/10; F23R 3/002; F23R 3/12; F23R 3/16; F02C 7/22; F23D 11/103; F23D 11/107

USPC .................................................... 60/740, 748
See application file for complete search history.

(56) References Cited

U.S. PATENT DOCUMENTS 2,780,061 A * 2/1957 Clarke .................... F23R 3/283
                                                         60/740
3,531,937 A * 10/1970 Sneeden ................... F23R 3/32
                                                         60/738

(Continued)

FOREIGN PATENT DOCUMENTS

| EP | 0660038 A2 | 6/1995 |
| GB | 809514 | 2/1959 |

OTHER PUBLICATIONS

EP Extended Search Report for Application No. 14167277.4 dated Feb. 26, 2015.

*Primary Examiner* — Phutthiwat Wongwian
*Assistant Examiner* — Alain Chau
(74) *Attorney, Agent, or Firm* — Ingrassia Fisher & Lorenz, PC

(57) ABSTRACT

In accordance with an exemplary embodiment, a fuel injector assembly is provided for a gas turbine engine with a compressor section and a combustion section. The fuel injector assembly includes a stem defining a fuel path for fuel and a flow guide coupled to and extending along the stem. The flow guide receives an air flow. The assembly further includes a swirler apparatus coupled to the stem and configured to receive the fuel. The swirler apparatus is further coupled to the flow guide and configured to receive the air flow. The swirler apparatus is configured to mix the fuel and the air flow and direct the mixture into a combustor of the combustor assembly.

18 Claims, 4 Drawing Sheets

(56) References Cited

U.S. PATENT DOCUMENTS

| | | | | |
|---|---|---|---|---|
| 3,631,675 A * | 1/1972 | Keiter | F23R 3/26 | 431/353 |
| 4,549,402 A | 10/1985 | Saintsbury et al. | | |
| 4,761,959 A * | 8/1988 | Romey | F23D 11/107 | 239/416.5 |
| 4,872,312 A | 10/1989 | Iizuka et al. | | |
| 4,928,479 A * | 5/1990 | Shekleton | F23R 3/28 | 60/746 |
| 5,579,645 A * | 12/1996 | Prociw | F23D 11/107 | 239/404 |
| 6,272,865 B1 * | 8/2001 | Clark | F23R 3/14 | 60/748 |
| 6,796,129 B2 | 9/2004 | Yee et al. | | |
| 6,895,756 B2 * | 5/2005 | Schmotolocha | F02K 3/10 | 60/749 |
| 7,500,364 B2 * | 3/2009 | Schumacher | F23R 3/04 | 60/751 |
| 7,624,576 B2 * | 12/2009 | Alkabie | F02C 7/22 | 239/399 |
| 7,707,835 B2 | 5/2010 | Lipinski et al. | | |
| 8,196,410 B2 * | 6/2012 | Patel | F23R 3/06 | 60/740 |
| 8,572,978 B2 * | 11/2013 | Mehring | F02C 3/145 | 60/740 |
| 2005/0132716 A1 | 6/2005 | Zupanc et al. | | |
| 2007/0022758 A1 | 2/2007 | Myers et al. | | |
| 2007/0193272 A1 * | 8/2007 | Hebert | F23D 11/107 | 60/740 |
| 2009/0173074 A1 | 7/2009 | Johnson et al. | | |
| 2011/0072823 A1 * | 3/2011 | Chen | F02C 7/222 | 60/742 |
| 2013/0036739 A1 | 2/2013 | Horikawa et al. | | |
| 2013/0305726 A1 * | 11/2013 | Carrere | F23D 11/103 | 60/746 |

\* cited by examiner

US 9,404,422 B2

GAS TURBINE FUEL INJECTOR HAVING FLOW GUIDE FOR RECEIVING AIR FLOW

TECHNICAL FIELD

The present invention generally relates to gas turbine engines, and more particularly relates to improved fuel injector assemblies for gas turbine engines.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections: a fan section, a compressor section, a combustor section, a turbine section, and an exhaust section. The fan section is positioned at the front or inlet section of the engine and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air it receives from the fan section to a relatively high level. In a multi-spool engine, the compressor section may include two or more compressors, such as, for example, a high pressure compressor and a low pressure compressor. The compressed air from the compressor section then enters the combustion section, where a ring of fuel nozzles injects a steady stream of fuel into the compressed air. The fuel-air mixture is ignited in the combustion section to generate combustion gases. The high-energy combustion gases from the combustion section then flow into and through the turbine section, thereby causing rotationally mounted turbine blades to rotate and generate energy. The air exiting the turbine section is exhausted from the engine via the exhaust section, and the energy remaining in the exhaust air aids the thrust generated by the air flowing through the bypass plenum.

In some engines, the compressor section is implemented with a centrifugal compressor. A centrifugal compressor typically includes at least one impeller that is rotationally mounted to a rotor and surrounded by a shroud. When the impeller rotates, it compresses the air received from the fan section and the shroud directs the air radially outward into a diffuser. The diffuser decreases the velocity and increases the static pressure of the air and directs the air into a deswirl assembly, which straightens the flow of the air before it enters the combustor section. The combustor section in some engines is implemented with an axial through-flow combustor that includes an annular combustor disposed within a combustor housing. The straightened air enters the combustion section and travels axially through the annular combustor where it is mixed with fuel and ignited.

The effectiveness of the aerodynamic coupling between the sections of the gas turbine engine impacts engine performance, operability and efficiency. To achieve optimal performance for a system, particularly one with a centrifugal compressor, the discharge flow from the centrifugal compressor is typically conditioned in an attempt to provide desired pressure and velocity characteristics. However, when an axial combustor is used in conjunction with the centrifugal compressor, efficiently directing air between the compressor and combustor may pose challenges.

Accordingly, there is a need for improved systems and methods for aerodynamically coupling sections of a gas turbine engine, particularly between a centrifugal compressor and an axial combustor to suitably direct and condition air flow for optimal performance. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a fuel injector assembly is provided for a gas turbine engine with a compressor section and a combustion section. The fuel injector assembly includes a stem defining a fuel path for fuel and a flow guide coupled to and extending along the stem. The flow guide receives an air flow. The assembly further includes a swirler apparatus coupled to the stem and configured to receive the fuel. The swirler apparatus is further coupled to the flow guide and configured to receive the air flow. The swirler apparatus is configured to mix the fuel and the air flow and direct the mixture into a combustor of the combustor assembly.

In accordance with an exemplary embodiment, a gas turbine engine is provided. The engine includes a compressor section comprising a compressor configured to compress an air flow and a deswirl assembly configured to receive the air flow from the compressor and a combustion section. The combustion section includes a fuel injector assembly with a stem defining a fuel path for fuel, a flow guide coupled to and extending along the stem, the flow guide receiving at least a portion of the air flow from the deswirl assembly, and a swirler apparatus coupled to the stem and configured to receive the fuel from the fuel path and the portion of the air flow from the flow guide. The swirler apparatus is further configured to mix the fuel and the portion of the air to result in a fuel-air mixture. A combustor is configured to receive the fuel-air mixture from the swirler apparatus and to ignite the fuel-air mixture to generate combustion gases.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include fuel injector assemblies that aerodynamically couple the compressor section to the combustion section in a gas turbine engine. In one exemplary embodiment, each fuel injector assembly includes a flow guide extending along the injector stem to capture air flow from the deswirl assembly and direct such air flow directly into the swirler apparatus, thereby providing improved air flow characteristics for combustion.

Figure 1:
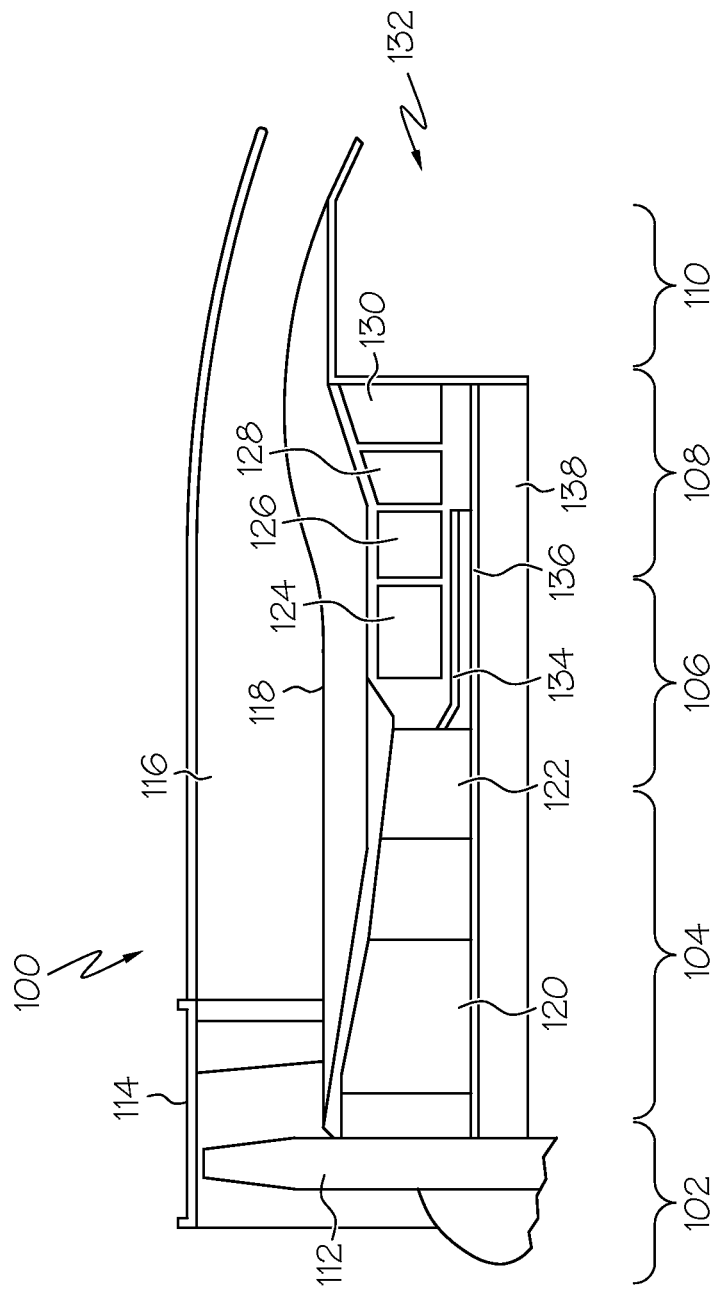
FIG. 1 is a simplified cross-sectional side view of a gas turbine engine according to an exemplary embodiment.

An exemplary embodiment of a multi-spool turbofan gas turbine jet engine 100 is depicted in the simplified cross-sectional view of FIG. 1. The engine 100 includes an intake section 102, a compressor section 104, a combustion section 106, a turbine section 108, and an exhaust section 110. The intake section 102 includes a fan 112, which is mounted in a fan case 114. The fan 112 draws in and accelerates air into the engine 100. A fraction of the accelerated air exhausted from the fan 112 is directed through a bypass section 116 disposed between the fan case 114 and an engine cowl 118 to provide a forward thrust. The remaining fraction of air exhausted from the fan 112 is directed into the compressor section 104.

The compressor section 104 includes two compressors, such as an intermediate pressure compressor 120 and a high pressure compressor 122. The intermediate pressure compressor 120 drives impellers to raise the pressure of the air introduced from the fan 112 and to direct the compressed air into the high pressure compressor 122. The high pressure compressor 122 drives impellers to compress the air still further and to direct the high pressure air into the combustion section 106. In the combustion section 106, which includes an annular combustor 124, the high pressure air is mixed with fuel and combusted. The combusted air is then directed into the turbine section 108.

The turbine section 108 includes one or more turbines disposed in axial flow series, such as a high pressure turbine 126, an intermediate pressure turbine 128, and a low pressure turbine 130. The combusted air from the combustion section 106 expands through each turbine, thereby causing the turbines to rotate. The air is then exhausted through a propulsion nozzle 132 disposed in the exhaust section 110 to provide additional forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Figure 2:
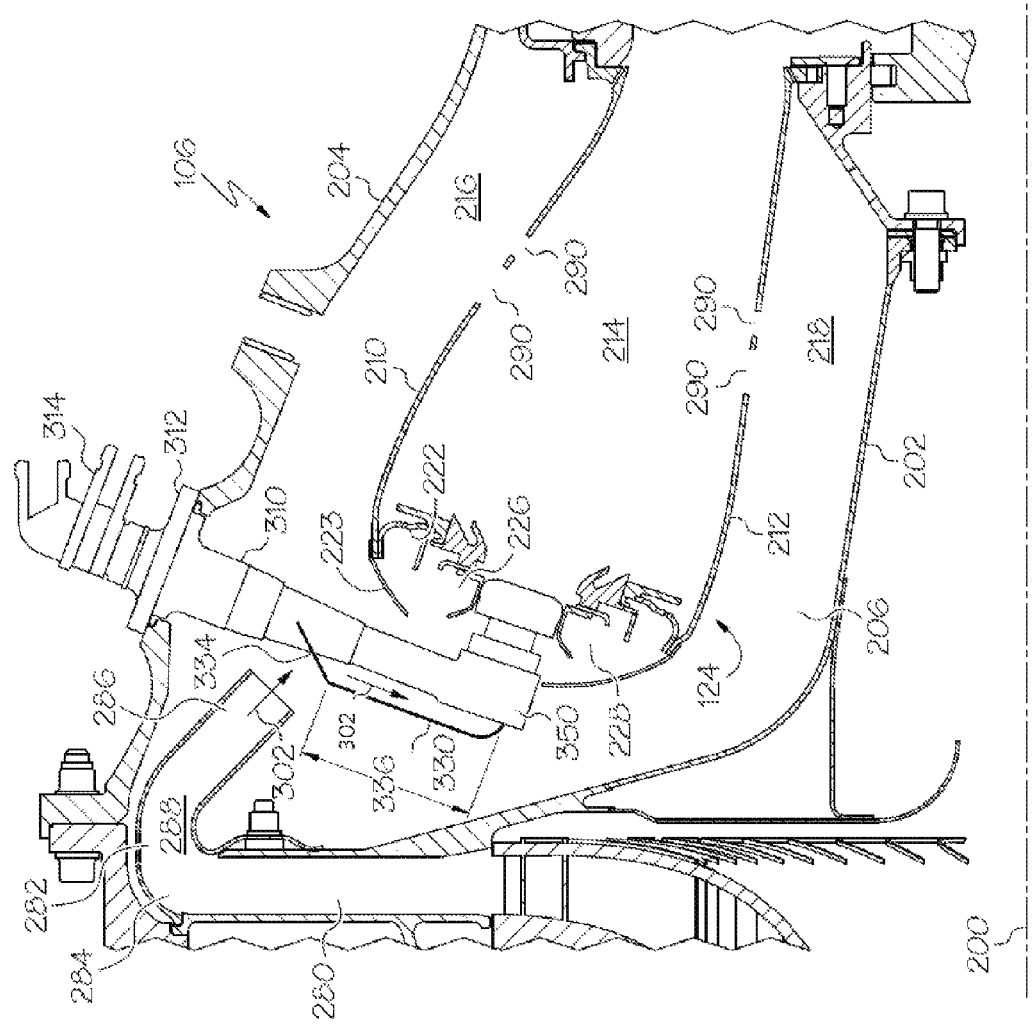
FIG. 2 is a partial cross-sectional view of a combustion section of the engine of FIG. 1 in accordance with an exemplary embodiment.

FIG. 2 is a more detailed cross-sectional view of a portion of the combustion section 106 of FIG. 1. In FIG. 2, only half the cross-sectional view is shown; the other half is substantially rotationally symmetric about an axis of rotation or centerline 200. The combustion section 106 of FIG. 2 is an annular combustor section, although aspects of exemplary embodiments described herein may also be useful in can combustors, can-annular combustors, and other types of combustors. Moreover, exemplary embodiments may find beneficial uses in many industries, including aerospace and particularly in high performance aircraft, as well as automotive, marine and power generation.

In addition to the combustion section 106, FIG. 2 depicts a diffuser 280 and a deswirl assembly 282, each disposed about centerline 200. In general, the diffuser 280 and deswirl assembly 282 function to direct air between the compressor section 104 (FIG. 1) and the combustion section 106. As noted above, the compressor section 104 (FIG. 1) may include a high pressure, centrifugal compressor 122 (FIG. 1) in which an impeller is driven by the high pressure turbine 126 (FIG. 1). In this exemplary embodiment, the diffuser 280 receives compressed air from an impeller discharge flow passage of the high pressure compressor 122 (FIG. 1) and directs the air radially outwardly. The diffuser 280 is configured to decrease the velocity and increase the static pressure of air.

The deswirl assembly 282 is in fluid communication with the diffuser 280 and functions to substantially remove swirl from air received therefrom, which decreases the Mach number of the air flow. The deswirl assembly 282 includes an inlet 284, an outlet 286, and a flow path 288 extending between the inlet 284 and outlet 286. In general, the flow path 288 is configured to receive the radially directed air that is discharged from the diffuser 280 and change its direction. More specifically, the flow path 288 may be configured to redirect the air from its radially outward direction to a radially inward and axially downstream direction. Thus, the flow path 288 may extend between the inlet 284 and outlet 286 in an arc such that when the air exits the outlet 286, it is directed at an angle and toward the longitudinal axis 200 and the annular combustor 124. Additional details about the air flow will be provided below, after an introduction of the combustion system 106.

The combustion section 106 includes a radially inner case 202 and a radially outer case 204 concentrically arranged with respect to the inner case 202. The inner and outer cases 202, 204 circumscribe the axially extending engine centerline 200 to define an annular pressure vessel 206. As noted above, the combustion section 106 also includes the combustor 124 residing within the annular pressure vessel 206. The combustor 124 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218. Although the liners 210, 212 in the depicted embodiment are of a single-walled construction, the liners 210, 212 may also be a double-walled construction.

The combustion section 106 includes a fuel injector assembly 220, a dome assembly 222, and fuel injector guide 226 that function to introduce air into the combustor 124, as described below. The combustor dome 222 is coupled between the upstream ends of the liners 210, 212. The fuel injector assembly 220 extends through a dome shroud 223 attached to the front end of the dome assembly 222 and is coupled to the combustor 124 through a fuel injector guide 226. One fuel injector assembly 220 and one fuel injector guide 226 are shown in the partial cross-sectional view of FIG. 2, although in the annular combustor 124, a number of fuel injector assemblies 220 and fuel injector guides 224 are provided about the centerline 200. As such, the dome shroud 223 has a number of openings to accommodate the fuel injector assemblies 220. The dome shroud 223, dome assembly 222 and fuel injector guides 226 may form an inner plenum 228 that receives air thought holes in the dome shroud 223. In one embodiment, the combustor 124 includes a total of sixteen circumferentially distributed fuel injector assemblies 220. It will be appreciated that the combustor 124 could be implemented with more or less than this number of fuel injector assemblies 220. Each fuel injector assembly 220 introduces a swirling, intimately blended fuel-air mixture that supports combustion in the combustion chamber 214. Additional details about the fuel injector assemblies 220 are provided below with reference to FIGS. 3 and 4.

As such, during engine operation, the high pressure, compressed air from the compressor section 104 (FIG. 1) is directed radially outwardly into the diffuser 280 and the deswirl assembly 282. The deswirl assembly 282 forces the air into an inward and axial flow toward the combustion section 106. As will be described in greater detail below, the air is then mixed with fuel and introduced into the forward end of the combustion chamber 214 for ignition and combustion. The depicted combustor 124 is a rich burn, quick quench, lean burn (RQL) combustor that relies upon predetermined stoichiometric fuel-air ratios during ignition and combustion, although further exemplary embodiments may include other types of combustors. Air jets that support combustion may be introduced into the combustion chamber 214 via air admission holes 290. Additional details about the fuel injector assemblies 220 will now be provided.

Figure 3:
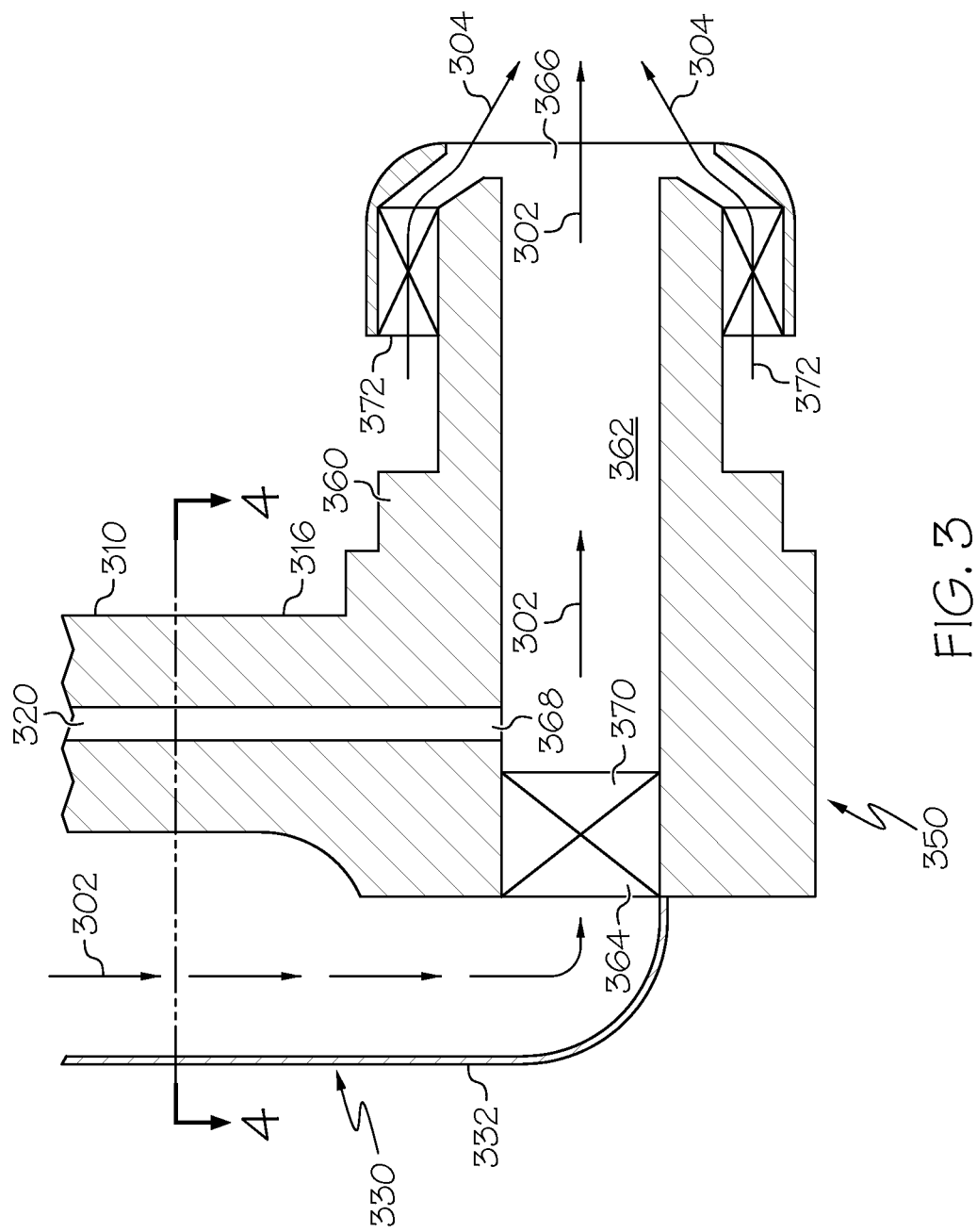
FIG. 3 is a more detailed, partial cross-sectional view a fuel injector assembly of the combustion section of FIG. 2 in accordance with an exemplary embodiment.
Figure 4:
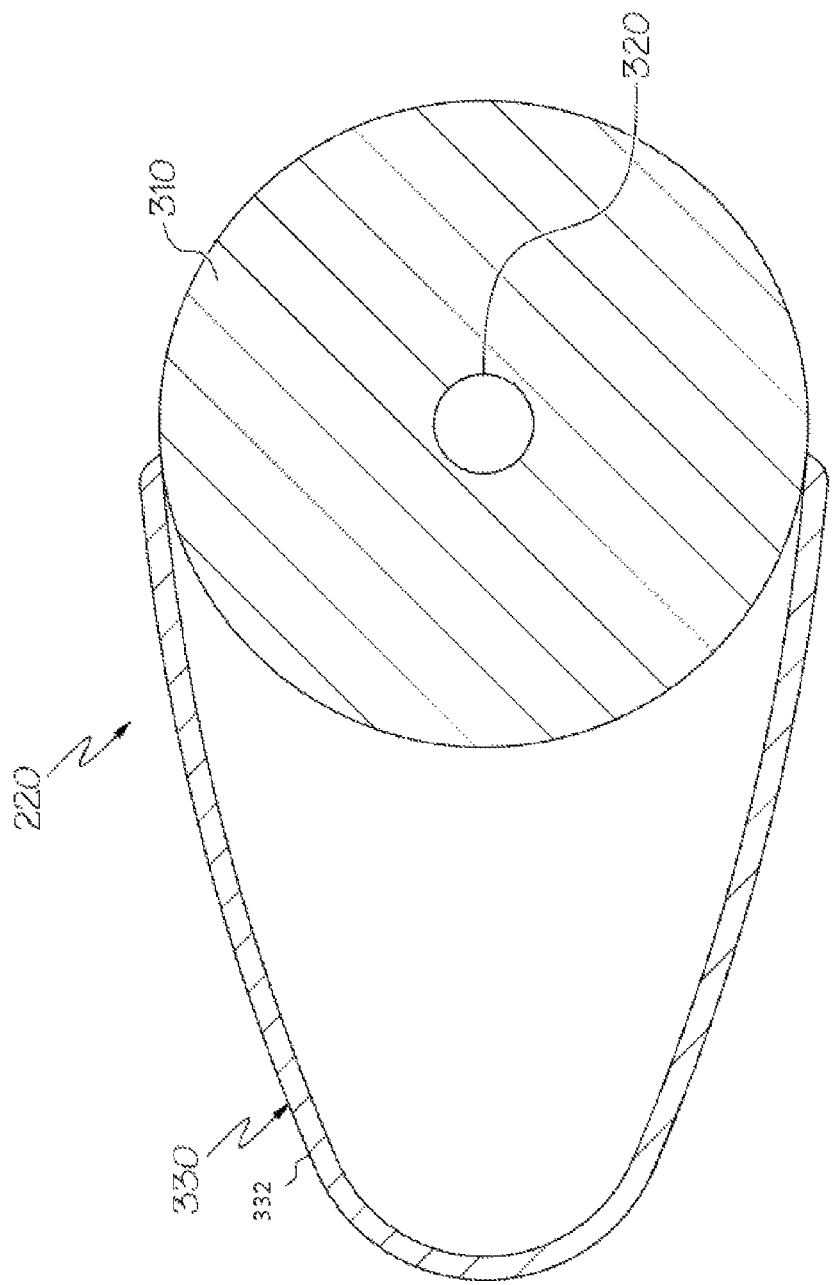
FIG. 4 is a cross-sectional view of the fuel injector assembly through line 4-4 of FIG. 3 in accordance with an exemplary embodiment.

FIG. 3 is a more detailed, partial cross-sectional view of a fuel injector assembly, such as the fuel injector assembly 220 of the combustor 124 of FIG. 2 in accordance with an exemplary embodiment, and FIG. 4 is a cross-sectional of the fuel injector assembly 220 through line 4-4 of FIG. 3 in accordance with an exemplary embodiment. In FIG. 3, the fuel injector assembly 220 has been removed from the dome shroud 223 and dome assembly 222. FIGS. 2-4 will be referenced below.

The fuel injector assembly 220 includes an injector stem 310 mounted on the outer case 204 (FIG. 2) with a flange 312. A first end 314 of the stem 310 is generally configured to be coupled to a fuel source (not shown) and a second end 316 of the stem 310 is generally coupled to a swirler apparatus 350, discussed below. In one exemplary embodiment, the stem 310 extends approximately in a radial direction. As best shown in FIG. 3, the stem 310 may define or house a fuel delivery line 320 that directs the fuel received at the first end 314, through the stem 310, and to the swirler apparatus 350. The fuel may be liquid or gaseous. Although FIGS. 3 and 4 depict the fuel delivery line 320 as being defined by the walls of the stem 310, the fuel delivery line 320 may have any suitable configuration, including a discrete tube housed within the stem 310 or outside the stem 310 that delivers fuel to the swirler apparatus 350.

An injector flow guide (or air guide) 330 is coupled to the injector stem 310. In the depicted exemplary embodiment, the flow guide 330 is attached to an outer surface of the injector stem 310. In general, the injector flow guide 330 is configured to receive a portion of the air flow (generally referenced as air flow 302) from the deswirl assembly 282 and to direct the air flow 302 into the swirler apparatus 350, as discussed in greater detail below. In one exemplary embodiment, the injector flow guide 330 is defined by a wall 332 with edges attached to the stem 310 to form an air flow baffle or duct between the wall 332 and the outer surface of the injector stem 310. As such, the wall 332 of the injector flow guide 330 defines an inlet 334 positioned generally along the length of the stem 310 to receive a portion of the air flow discharged from the deswirl assembly 282. In one exemplary embodiment, the injector flow guide 330 may be fabricated from sheet metal. Moreover, the injector flow guide 330 may be shaped and attached by any suitable technique to the injector stem 310, including welding or brazing.

The injector flow guide 330 may have any suitable shape and configuration to provide the desired characteristics of air flow to be introduced into the swirler apparatus 350. For example, the injector flow guide 330 may have any suitable length 336, including a length 336 that is a function of a length of the stem 310 between the flange 312 and the swirler apparatus 350. In one exemplary embodiment, the inlet 334 is positioned at approximately the midpoint of the length of the stem 310. In other embodiments, the inlet 334 is arranged at a position between approximately 25% and approximately 75% of the length of the stem 310. Similarly, the inlet 334 may have any suitable shape. In the depicted embodiment and as best shown in FIG. 2, the inlet 334 has extended edges that taper to the outer wall of the stem 310. The cross-sectional shape of the injector flow guide 330 may be based on the desired volume, velocity, and pressure characteristics of the air flow. In the depicted embodiment, the cross-sectional shape is a semi-circular or half-moon shape, as best shown in the cross-sectional view of FIG. 4. In one exemplary embodiment, the injector flow guide 330 has a size and shape such that the fuel injector assembly 220 may be introduced or removed through an existing hole or orifice in the outer case 204, thereby enabling more efficient installation and maintenance.

As noted above, the fuel injector assembly 220 includes the swirler apparatus 350 that is coupled to the radial end 316 of the stem 310. The swirler apparatus 350 may include a manifold 360 that defines a generally axial flow path 362 with an inlet 364 and an outlet 366. The manifold 360 also defines at least one fuel outlet 368. The fuel outlet 368 is fluidly coupled to the fuel delivery line 320 and introduces fuel into the flow path 362. The fuel outlet 368 may include an atomizer to atomize the fuel. Although not shown, a plurality of fuel outlets 368 may be circumferentially arranged about the manifold 360. In general, the fuel outlet 368 may have any suitable configuration or arrangement for introducing fuel to the swirler apparatus 350.

The manifold 360 additionally houses one or more airblast swirlers 370, 372. In general, the swirlers 370, 372 are configured to shape the compressed air into a generally circular flow pattern to, among other things, assist in rapidly mixing the fuel and air to improve combustion of the fuel-air mixture upon exit from the fuel injector assembly 220. As such, the swirlers 370, 372 function to atomize and partially mix the fuel with inlet air. A first or inner swirler 370 may be positioned within the flow path 362 defined by the manifold 360 to receive the air flow 302 from the injector flow guide 330, mix the air flow 302 with fuel introduced at the fuel outlet 368, and condition the mixture for combustion. A second or outer swirler 372 may be positioned downstream of the inner swirler 370 to introduce additional air flow 304 (e.g., a portion of the air within the plenum 228 (FIG. 2)) and condition the air flow 304 for mixing with the air and fuel mixture from the flow path 362. The resulting mixture exits the swirler apparatus 350 and the fuel injector assembly 220 and flows into the combustion chamber 214 to support ignition and combustion. In the depicted embodiment, the fuel outlet 368 is positioned between the swirlers 370, 372. However, in further embodiments, the fuel outlet 368 may be positioned upstream of both swirlers 370, 372 or downstream of both swirlers 370, 372. Although two swirlers 370, 372 are depicted in FIG. 3, additional swirlers may be provided or one of the swirlers 370, 372 may be omitted.

Although the swirlers 370, 372 may be any one of numerous types of swirlers, in the depicted embodiment, each is an axial swirler, although other arrangements may be provided, such as radial swirlers. Furthermore, the swirlers 370, 372 may include, as example, aerodynamic vanes, flat vanes or tangentially drilled holes. It will additionally be appreciated that the inner and outer swirlers 370, 372 may be configured to supply the same or different degree of swirl to the air and/or to supply the same or different amounts of air.

Accordingly, during operation and referring to FIGS. 2-4, air from the deswirl assembly 282 forces the air into an inward and axial flow into the combustor section 104. A portion of the air flow enters the injector flow guide 330 and is directed into the swirler apparatus 350. The air flow is mixed with fuel and additional air flow, conditioned, and directed into the combustion chamber 214.

In particular, the fuel injector assembly 220 provides an improved mechanism for capturing the discharge air from the deswirl assembly 282 and creating a more balanced air distribution on both the inner and outer swirlers 370, 372. In one exemplary embodiment, the injector flow guide 330 is attached to the fuel injector stem 310 to directly capture a portion of the air and direct it down toward an inlet of the inner swirler 370. In this manner, both the inner and outer swirlers 370, 372 receive a more comparable inlet flow distribution and improvements in fuel atomization may be realized.

Conventionally, air discharged from the deswirl may be partially captured using the dome shroud and redistributed to the various flow features inside of the shroud, including the fuel injector swirlers. However, in conventional designs, it may be difficult provide a practical dome shroud configuration that fully encompasses the inlets to both the inner and outer swirlers. As a result, in conventional designs, the inner swirler may not receive the benefit of the air pressure recovery and flow redistribution that the outer swirler does, thus creating the possibility of a reduced inlet pressure at the inner swirler, an imbalance in the air feeds to the injector, and a deterioration in the atomizer performance due to the reduced velocity of the inner swirler airstream. In contrast, the fuel injector assembly 220 according to the exemplary embodiments above directs the air flow 302 through the flow guide 330 as needed or desired directly to the inner swirler 370 to improve air distribution on both the inner and outer swirlers 370, 372, and thus, improve operation.

Exemplary embodiments discussed above may provide a gas turbine engine that operates more efficiently. In particular, the fuel injector assemblies provide a more direct aerodynamic coupling between the compressor and the combustor such that the air flow into the combustor is optimized. For example, such air flow may suffer decreased internal flow losses and improved static pressure recovery prior to introduction into the combustion chamber, thereby improving low pressure operation, including high-altitude ignition and light-around, as well as significant reductions in high-power combustion emissions, including substantial improvements in smoke levels. Additionally, the engine is relatively inexpensive and simple to implement into existing engine configurations in which a centrifugal compressor is mounted with an axial combustor, particularly aircraft engines.

The exemplary embodiments discussed above are not limited to use in conjunction with a particular type of turbine engine. Thus, although the exemplary embodiments are, for convenience of explanation, depicted and described as being implemented in a multi-spool turbofan gas turbine jet engine, it will be appreciated that it can be implemented in various other types of turbines, and in various other systems and environments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel injector assembly for a gas turbine engine with a compressor section and a combustion section, the fuel injector assembly comprising:

a stem defining a fuel path for fuel, wherein the stem includes a flange coupling the stem to an outer case of the combustion section, the stem defining a length between the flange and the swirler apparatus;

a flow guide coupled to and extending along the stem, the flow guide receiving an air flow; and a swirler apparatus coupled to the stem and configured to receive the fuel, the swirler apparatus further coupled to the flow guide and configured to receive the air flow, the swirler apparatus configured to mix the fuel and the air flow and direct the mixture into a combustor of the combustor assembly, wherein the flow guide has a first radial end positioned along the length of the stem and a second radial end at the swirler apparatus, the first radial end of the flow guide being open to define a flow guide inlet for receiving the air flow and the second radial end of the flow guide being closed to direct the air flow within the flow guide into the swirler apparatus, wherein the stem and flow guide extend in a generally radial direction such that the first radial end of the flow guide receives the air flow in the generally radial direction to guide the air flow along the stem in the generally radial direction and such that the second radial end of the flow guide redirects the air flow in a generally axial direction into the swirler apparatus.

2. The fuel injector assembly of claim 1, wherein the first radial end and the flow guide inlet are positioned between about 75% and about 25% of the length of the stem.

3. The fuel injector assembly of claim 1, wherein the compressor section includes a deswirl assembly, and wherein the flow guide is configured to aerodynamically couple the deswirl assembly to the swirler apparatus.

4. The fuel injector assembly of claim 1, wherein swirler apparatus includes a manifold defining a flow path.

5. The fuel injector assembly of claim 4, wherein the manifold defines a fuel outlet coupled to the fuel path and configured to introduce the fuel into the flow path.

6. The fuel injector assembly of claim 4, wherein the swirler apparatus further includes a swirler positioned within the manifold.

7. A gas turbine engine, comprising:

a compressor section comprising a compressor configured to compress an air flow and a deswirl assembly configured to receive the air flow from the compressor; and a combustion section comprising a fuel injector assembly with a stem defining a fuel path for fuel, a flow guide coupled to and extending along the stem, the flow guide receiving at least a portion of the air flow from the deswirl assembly, and a swirler apparatus coupled to the stem and configured to receive the fuel from the fuel path and the portion of the air flow from the flow guide, the swirler apparatus further configured to mix the fuel and the portion of the air to result in a fuel-air mixture, wherein the stem includes a flange coupling the stem to an outer case, the stem defining a length between the flange and the swirler apparatus, wherein the flow guide has a first radial end positioned along the length of the stem and a second radial end at the swirler apparatus, the first radial end of the flow guide being open to define a flow guide inlet for receiving the portion of the air flow from the deswirl assembly and the second radial end of the flow guide being closed to direct the portion of the air flow within the flow guide into the swirler apparatus, wherein the flow guide has two edges attached to the stem to form a flow guide path for the air flow within the flow guide, and wherein the flow guide path is semi-circular shaped or half-moon shaped in cross-section, and a combustor configured to receive the fuel-air mixture from the swirler apparatus and to ignite the fuel-air mixture to generate combustion gases.

8. The gas turbine engine of claim 7, wherein the compressor is a centrifugal compressor.

9. The gas turbine engine of claim 8, wherein the combustor is an axial annular combustor.

10. The gas turbine engine of claim 7, wherein the stem and flow guide extend in a generally radial direction such that the first radial end of the flow guide receives the portion of the air flow in the generally radial direction to guide the portion of the air flow along the stem in the generally radial direction and such that the second radial end of the flow guide redirects the portion of the air flow in a generally axial direction into the swirler apparatus.

11. The gas turbine engine of claim 7, wherein the first radial end and the flow guide inlet are positioned between about 75% and about 25% of the length of the stem.

12. The gas turbine engine of claim 7, wherein the flow guide is configured to aerodynamically couple the deswirl assembly to the swirler apparatus.

13. The gas turbine engine of claim 7, wherein swirler apparatus includes a manifold defining a flow path.

14. The gas turbine engine of claim 13, wherein the manifold defines a fuel outlet coupled to the fuel path and configured to introduce the fuel into the flow path.

15. The gas turbine engine of claim 14, wherein the swirler apparatus further includes a swirler positioned within the manifold.

16. A fuel injector assembly for a gas turbine engine with a compressor section and a combustion section, the fuel injector assembly comprising:

a stem defining a fuel path for fuel, wherein the stem includes a flange coupling the stem to an outer case of the combustion section, the stem defining a length between the flange and the swirler apparatus;

a flow guide coupled to and extending along the stem, the flow guide receiving an air flow; and a swirler apparatus coupled to the stem and configured to receive the fuel, the swirler apparatus further coupled to the flow guide and configured to receive the air flow, the swirler apparatus configured to mix the fuel and the air flow and direct the mixture into a combustor of the combustor assembly, wherein the flow guide has a first radial end positioned along the length of the stem and a second radial end at the swirler apparatus, the first radial end of the flow guide being open to define a flow guide inlet for receiving the air flow and the second radial end of the flow guide being closed to direct the air flow within the flow guide into the swirler apparatus, wherein the flow guide has two radially extending edges attached to the stem to form a flow guide path for the air flow within the flow guide.

17. The fuel injector of claim 16, wherein the stem and flow guide extend in a generally radial direction such that the first radial end of the flow guide receives the air flow in the generally radial direction to guide the air flow along the stem in the generally radial direction and such that the second radial end of the flow guide redirects the air flow in a generally axial direction into the swirler apparatus.

18. The fuel injector assembly of claim 16, wherein the flow guide path is semi-circular shaped or half-moon shaped in cross-section.

* * * * *